(12) United States Patent
Stöck

(10) Patent No.: US 11,984,777 B2
(45) Date of Patent: May 14, 2024

(54) METHOD FOR THE THERMAL TREATMENT OF A COMPRESSED STRAND, METHOD FOR PRODUCING AN ELECTRIC MOTOR, AND METHOD FOR PRODUCING A MOTOR VEHICLE

(71) Applicant: JHEECO E-DRIVE AG, Eschen (LI)

(72) Inventor: Martin Stöck, Salez (CH)

(73) Assignee: JHEECO E-DRIVE AG, Eschen (LI)

( * ) Notice: Subject to any disclaimer, the term of this patent is extended or adjusted under 35 U.S.C. 154(b) by 396 days.

(21) Appl. No.: 17/260,919

(22) PCT Filed: Jul. 17, 2019

(86) PCT No.: PCT/EP2019/069204
§ 371 (c)(1),
(2) Date: Jan. 15, 2021

(87) PCT Pub. No.: WO2020/016278
PCT Pub. Date: Jan. 23, 2020

(65) Prior Publication Data
US 2021/0305887 A1   Sep. 30, 2021

(30) Foreign Application Priority Data
Jul. 17, 2018 (DE) .................... 10 2018 211 867.1

(51) Int. Cl.
*H02K 15/12* (2006.01)
*B62D 65/00* (2006.01)
(Continued)

(52) U.S. Cl.
CPC ............ *H02K 15/125* (2013.01); *C22F 1/08* (2013.01); *B60K 1/00* (2013.01); *B60K 2001/001* (2013.01); *B62D 65/00* (2013.01)

(58) Field of Classification Search
CPC .......... H02K 15/125; C22F 1/08; B60K 1/00; B60K 2001/001; B62D 65/00
See application file for complete search history.

(56) References Cited

U.S. PATENT DOCUMENTS

| | | | |
|---|---|---|---|
| 2010/0320194 A1 | 12/2010 | Koide et al. | |
| 2019/0139668 A1* | 5/2019 | Yoshida | H01B 5/02 |
| 2019/0267151 A1* | 8/2019 | Kusakari | H01B 1/02 |

FOREIGN PATENT DOCUMENTS

| | | | |
|---|---|---|---|
| DE | 155435 A1 | 6/1982 | |
| DE | 3639631 A1 | 6/1988 | |

(Continued)

OTHER PUBLICATIONS

WO-2015162586-A2, machine translation. (Year: 2015).*
(Continued)

*Primary Examiner* — John A Hevey
(74) *Attorney, Agent, or Firm* — Calfee, Halter & Griswold LLP

(57) ABSTRACT

The present invention relates to a method for the thermal treatment of a compressed strand, where the thermal treatment of the compressed strand is carried out in a state installed as intended in a component of an electric motor, to a method for producing an electric motor with at least one component having at least one compressed strand, the compressed strand being thermally treated according to the invention, and to a method for producing a motor vehicle with an electric motor, the electric motor being produced according to the invention.

11 Claims, 2 Drawing Sheets

(51) Int. Cl.
*C22F 1/08* (2006.01)
*B60K 1/00* (2006.01)

(56) References Cited

FOREIGN PATENT DOCUMENTS

| | | | |
|---|---|---|---|
| DE | 3718429 A1 | | 12/1988 |
| EP | 2328154 A1 | | 6/2011 |
| EP | 3096440 A1 | | 11/2016 |
| JP | 2008072825 A | * | 3/2008 |
| JP | 2008072825 A | | 3/2008 |
| KR | 20130118097 A | * | 10/2013 |
| WO | WO-2015162586 A2 | * | 10/2015 ......... H02K 15/0081 |
| WO | 2020016278 A1 | | 1/2020 |

OTHER PUBLICATIONS

KR-20130118097-A, machine translation. (Year: 2013).*
JP-2008072825-A, machine translation. (Year: 2008).*
International Search Report from PCT/EP2019/069204 dated Oct. 17, 2019 (3 pages).

* cited by examiner

METHOD FOR THE THERMAL TREATMENT OF A COMPRESSED STRAND, METHOD FOR PRODUCING AN ELECTRIC MOTOR, AND METHOD FOR PRODUCING A MOTOR VEHICLE

CROSS-REFERENCE TO RELATED APPLICATIONS

This application is a 371 of PCT Application No. PCT/EP2019/069204 filed on Jul. 17, 2019, which claims priority to German Application No. 10 2018 211 867.1 filed on Jul. 17, 2018, the contents of which are hereby incorporated by reference as if recited in their entirety.

The invention relates to a method for the thermal treatment of a compressed strand according to the preamble of claim 1, a method for producing an electric motor according to the preamble of claim 14, and a method for producing a motor vehicle with an electric motor according to the preamble of claim 15.

Compressed strands are litz wires, i.e., twisted or untwisted tufts of wire, which are compacted and thus given a certain cross-sectional shape, typically a rectangular cross-sectional shape. The wires are preferably copper wires or wires made of a copper alloy. The wires themselves or also the compressed strand is surrounded by an insulation material, for example, a varnish. In most cases, compressed strands have cable lugs at the ends that serve as an electrical and/or mechanical connection of the compressed strand.

Compressed strands can be used as Milliken conductors in electrical machines, in particular in stators. Milliken conductors are conductor sections which are e.g., inserted or drawn into stator slots. The protruding ends of two compressed strands can then be connected directly to form half-coils.

During the production of the compressed strands, the wires are deformed, in particular cold-deformed. Negative effects can arise with the deformation, such as a decrease in electrical conductivity because the ohmic resistance increases due to the cold work hardening.

A remedy there is the thermal treatment of the compressed strands, for example, in the form of recrystallization annealing, prior to the installation into the electric motor. The lattice structure that has been dislocated by the cold deformation can be partially or completely healed by annealing. This depends substantially on the annealing temperature and the duration. During recrystallization annealing, the grain structure is completely re-formed; this is optimal for electrical conductivity.

Such methods are known, for example, from EP 30 96 440 A. However, the drawback of this method is that the process effort is relatively large. The compressed strand is clamped in a kind of stand and heated by way of an electric current. It is evident that this process is somewhat complex for mass production of electric motors which are to be equipped with this compressed strand.

This is where the present invention comes in and is faced with the object of proposing an improved method for producing an electric motor, in particular proposing a method which enables more efficient thermal treatment of the compressed strand.

According to the invention, this object is satisfied in that the compressed strand is subjected to thermal treatment in a state installed as intended in a component of an electric motor. In other words, the compressed strands are subjected to thermal treatment in the already installed and interconnected state and not in an external device. This renders separate apparatuses obsolete. Furthermore, thermal treatment in an already installed state of the compressed strand is advantageous also for the reason that the compressed strands are no longer heat-treated independently of one another but rather together in the target system. In this respect, the compressed strands installed can already interact so that mutual influences of the compressed strands can be better compensated for. The result is a compressed strand system with less variance between the individual Milliken conductors. The overall efficiency of the system increases. Temperature hotspots are reduced in terms of quality and quantity.

Further advantageous configurations of the proposed invention arise in particular from the features of the dependent claims. The objects or features of the various claims can in principle be combined with one another at random.

It can be provided in one advantageous configuration of the method that thermal treatment is carried out after completion of the component, in particular of the stator, after completion of the electric motor and prior to the installation of the electric motor into a vehicle, and/or after or during the initial operation of the vehicle with the electric motor.

In a further advantageous configuration of the method, it can be provided that the thermal treatment involves recrystallization annealing or stress relief annealing.

It can be provided in a further advantageous configuration of the method that the component of the electric motor is the stator and/or rotor of the electric motor. The compressed stranded is preferably installed into the stator, in particular as a Milliken conductor.

It can be provided in a further advantageous configuration of the method that heating the compressed strand for thermal treatment is carried out by applying electric current to the compressed strand. This type of introduction of heat for thermal treatment of the compressed strand gives rise to numerous advantages. For example, the current flowing through the system will heat precisely those places that exhibit higher resistance. As a result, the defects in the compressed strand system are acted upon longer and/or at higher temperatures and are therefore more successfully heat-treated. Thermal treatment by energization has the further advantage that heat is generated within the conductor and does not have to penetrate from the outside through the insulation material. The insulation material is therefore heated less than in annealing furnaces. In addition, the annealing temperature can be freely selected by energizing and is very variable in terms of time. In this way, different annealing temperature profiles can be run without having to maintain complex temperature tunnels, such as in production lines with annealing lanes, with different temperature regions. Furthermore, each of the motor windings can be individually energized and thereby heat-treated: Two different motors can experience two different thermal treatment curves on the same "thermal treatment stand"—advantageous annealing curves can be determined e.g., experimentally. Thermal treatment curve presently means a specific time-temperature curve or current-time curve.

It can be provided in a further advantageous configuration of the method that the compressed strand is equipped with an insulation material, where the thermal treatment is carried out at a temperature below, equal to, or above the long-term temperature resistance of the insulation material. If the wires or strands are heat-treated without insulation or have only little heat-sensitive insulation materials, then the thermal treatment temperature can be selected within a wide range. However, if an insulated compressed strand or its insulated wires, respectively, are to be thermally treated, there is a conflict of objectives between the "optimal" thermal treatment temperature and the preservation of the insulation. For this reason, insulated conductors or strands are usually not thermally treated or only at very low temperatures (well below the recrystallization temperature). Longer duration of the thermal treatment can in part compensate for a lower temperature, but is only economically sensible to a limited degree in the production line. A thermal treatment process below the resistance temperature of the insulation material protects the insulation material, but requires a longer thermal treatment process. Alternatively, thermal treatment can also be carried out at a temperature above the temperature resistance of the insulation material. With this procedure, the tolerance of the insulation material with regard to short-term temperature resistance is intentionally exploited such that the thermal treatment is carried out above the fatigue-endurable long-term temperature resistance of the insulation material. If carried out professionally, this does not necessarily lead to the destruction of the insulation material, but it can lead to considerably shorter thermal treatment times so that the production process can be further economized. Thermal treatment at a temperature which corresponds to the maximum long-term resistance temperature of the insulation material is of course also conceivable.

Temperatures of 150-250° C., in particular 170°+−10° C., have proven to be particularly advantageous for thermal treatment. At such temperatures in the vicinity of the permanent temperature resistance of the insulation material, thermal treatment can be carried out over long periods of time without fear of premature degradation of the material due to excessive heat input.

A period of 30 to 300 minutes has also proven to be advantageous for the duration of a single thermal treatment. This period of time is long enough for uniform temperature distribution to be established over all compressed strands so that lattice defects in the compressed stranded wires can be reduced. Furthermore, the longer the thermal treatment takes, the greater the confidence interval for predicting the effects of the thermal treatment. Failure probabilities can then be predicted more precisely than with more frequent but shorter thermal treatment times over the same overall duration of action.

It can be provided in a further advantageous configuration of the proposed method that the cumulative thermal treatment time on the compressed strand does not exceed a proportion of 10% of the operating time of the compressed strand. As a result, the temperature-related aging influence of the thermal treatment on the insulation material can be kept controllably low. In particular, failure probabilities and other risks can be predicted.

It can be provided in a further advantageous configuration of the method that the thermal treatment on the compressed strand takes place after the completion of the electric motor and prior to the installation into a vehicle and that the thermal treatment on the compressed strand takes place at an excessive temperature, i.e., takes place at a temperature above the long-term resistance temperature of the insulation material. This variant in production has the advantage of provoking early failure of the system and thereby preventing fault-prone products from being installed into the end product. Thermal treatment of the compressed strand within the production line, i.e., after completion of the component or after completion of the electric motor and prior to the installation into the vehicle, can preferably be carried out in parallel with other quality tests so that the duration of the production process is not or only hardly extended by the thermal treatment of the compressed strand. The test run of the motor system during the final acceptance is preferred for this.

It can be provided in a further advantageous configuration of the method that thermal treatment of the compressed strand takes place after or during the initial operation of the vehicle and the compressed strand is heated by regulating or switching off the motor cooling and/or by idling, in particular as a result of intentionally applied leakage currents, which generate heat but no torque. The aforementioned options are characterized in that they can be implemented in a simple manner into the electric motor or into the vehicle, since elements that are already present, such as the motor cooling or motor management, are used. These measures can ultimately also be carried out or initiated by the end user of the motor vehicle. However, automated initiation of the thermal treatment is of course also conceivable, for example, based on resistance measurements or preprogrammed time intervals.

In order to economize the production process, it can be provided to break down the thermal treatment into partial intervals and for a first part to be carried out prior to the vehicle's initial operation, and all further time intervals after vehicle's initial operation. As a result, throughput times in motor production can be reduced without permanent loss of efficiency.

It can be provided in a further advantageous configuration of the method that the thermal treatment is repeated regularly, in particular quarterly or annually. In this way it can be ensured that cold work hardening in the compressed strand, such as that caused by externally introduced vibrations, does not lead to a steadily deteriorating degree of efficiency of the compressed strand It can be provided in a further advantageous configuration of the method that compressed strands with a degree of compaction higher than 80% are used. Due to the high degree of compaction, heat transfer between individual wires of a compressed strand is higher than with wires less compacted. This results in a more homogeneous temperature distribution over the cross-section of the compressed strand so that higher annealing temperatures can be run. In particular, the inner individual wires or the wires of the compressed strand core, respectively, can be heated closer to the maximum temperature permissible before the individual wire insulation burns, without the permissible maximum temperature of the individual wire insulation of the outermost wires being exceeded. Overall, annealing times can be shortened as a result. Another object of the invention is to propose an improved method for producing an electric motor with at least one component having at least one compressed strand, in particular to propose a method which enables more efficient thermal treatment of the compressed strand.

According to the invention, this object is satisfied by a method having the characterizing features of claim 14. Due to the fact that the electric motor is produced using the method for thermal treatment of a compressed strand, the advantages resulting from the thermal treatment method can be made use of for the production of the electric motor.

A further object of the present invention is to propose an improved method for producing a motor vehicle with an electric motor, in particular to propose a method which enables more efficient thermal treatment of the compressed strand in the electric motor.

According to the invention, this object is satisfied by a method having the characterizing features of claim 15. Due to the fact that the vehicle or the electric motor of the vehicle, respectively, is produced using the method for thermal treatment of a compressed strand, the advantages resulting from the thermal treatment method can be used for the production of the electric motor or vehicle, respectively.

Further features and advantages of the present invention will become apparent from the following description of preferred embodiments with reference to the accompanying figures. Shown schematically in FIG. 1 is a compressed strand in a side view provided for the thermal treatment according to the invention;

Figures 1, 2:
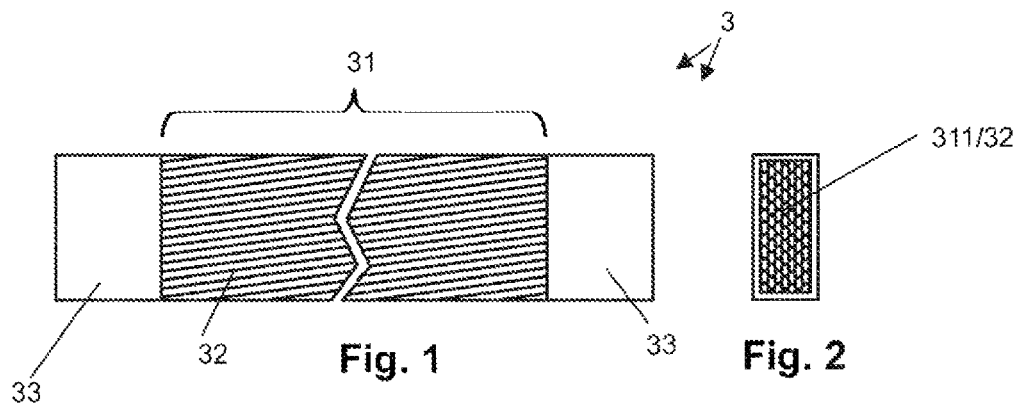
FIG. 2 is a compressed strand in a front view provided for the thermal treatment according to the invention.
Figure 3:
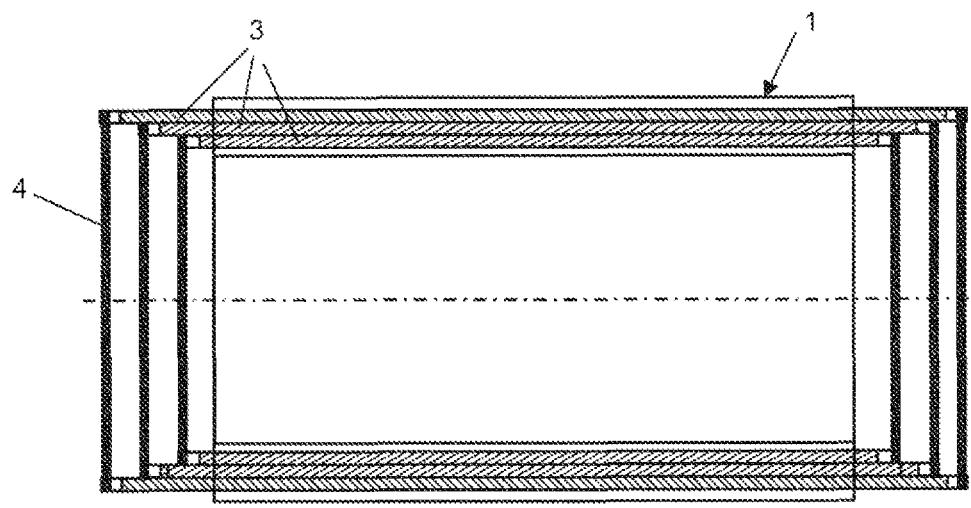
FIG. 3 is a stator of an electric motor with compressed strands and end windings in a sectional side view.
Figure 4:
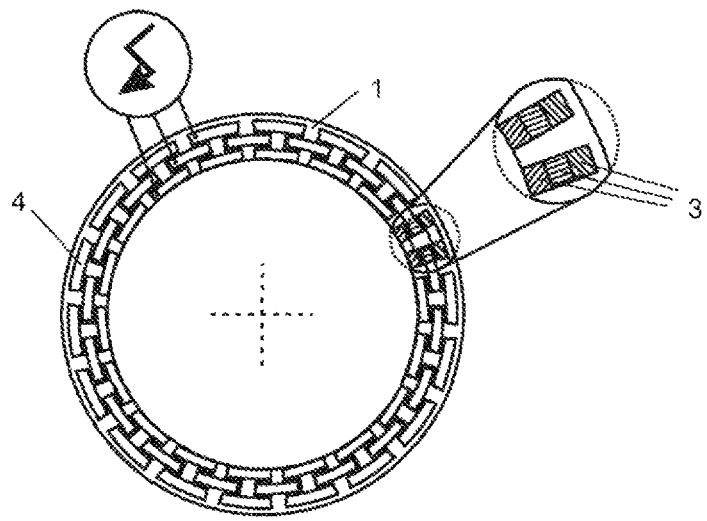
FIG. 4 is a stator of an electric motor with compressed strands and interconnection webs in a front view.
Figure 5:
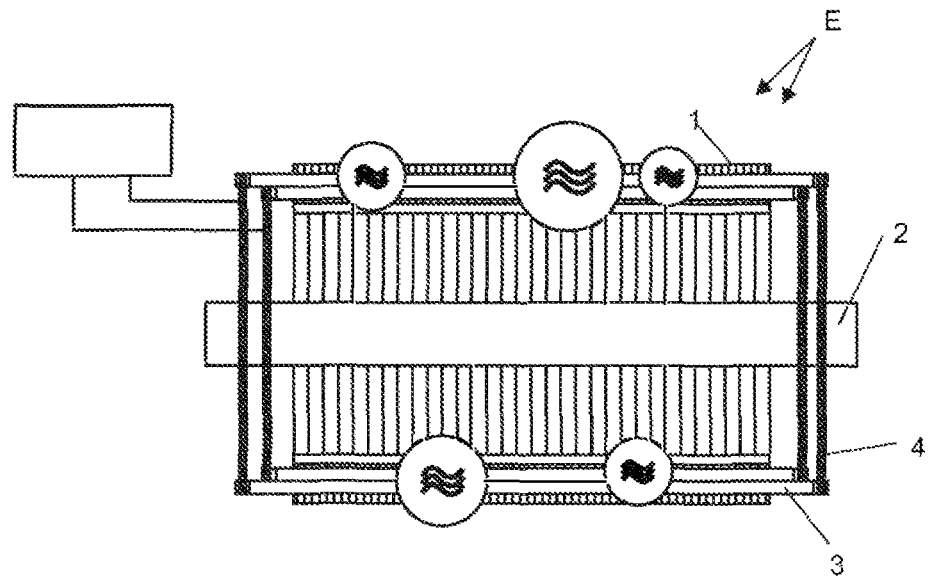
FIG. 5 is an electric motor with a stator equipped with compressed strands in a side sectional view.
Figure 6:
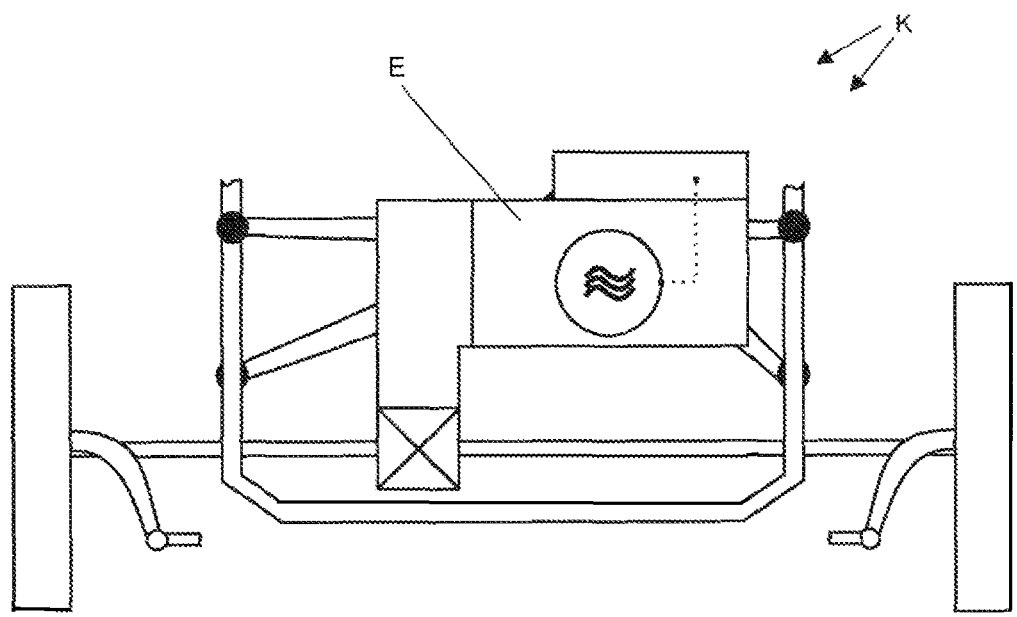
FIG. 6 is a motor vehicle with an electric motor equipped with compressed strands.

Reference is first made to FIG. 1.

A compressed strand 3 comprises substantially a number of wires 311, in particular copper wires or wires made of a copper alloy. Wires 311 are typically twisted together to form a wire package 31, and twisted wire package 31 is furthermore compacted, in particular, pressed to have a rectangular cross section. In addition, the individual wires are preferably provided with insulation, typically a varnish, and preferably the wire package is provided with insulation 32. Compressed strands typically have barrels at the ends that serve as an electrical and in particular a mechanical connection of the compressed strand.

An electric motor E, in particular an asynchronous motor, comprises substantially a stator 1 and a rotor 2 as the main components. One component of the electric motor, preferably the stator, but conceivably also the rotor, is preferably equipped with at least one compressed strand 3. The compressed strands used are preferably configured as rod-shaped Milliken conductors. The compressed strand is preferably installed into the component in a manner known to the person skilled in the art. The compressed strands can be connected to one another, for example, by way of interconnection webs 4. The component with the compressed strand (s) is assembled with other components to form an electric motor E. The electric motor is in turn installed into a vehicle K, preferably into a motor vehicle.

The thermal treatment can be carried out in different production stages, in particular
  a) after completion of the component, in particular the stator,
  b) after completion of the electric motor and prior to the installation of the electric motor into a vehicle, and/or
  c) after or during the initial operation of the vehicle with the electric motor.

The thermal treatment is preferably recrystallization annealing or stress relief annealing. Recrystallization annealing is to be understood to mean annealing without a phase change at a temperature in the recrystallization range after cold deformation. Stress relief annealing is to be understood to mean annealing without a phase change at a temperature below the recrystallization temperature after cold deformation.

The introduction of heat for thermal treatment of the compressed strand is preferably carried out by energizing the compressed strand, i.e., by having current act upon the compressed strand to be heated. (Symbols with wavy lines represent heat input.) The individual compressed strands can there be selectively heated, in particular individual circuits of compressed strands can be selectively acted upon with current for thermal treatment.

The quality of the thermal treatment process is substantially dependent upon the factors temperature and time. With regard to the temperature, it is noteworthy that compressed strand 3 is applied insulation material 32 which is damaged from a certain temperature, so that the time of the thermal treatment comes into focus. The maximum permissible temperature is in principle limited by the insulation material.

The temperature resistance of insulation material is typically divided into classes according to DIN EN 60085. Classes F (up to 155° C.) and H (up to 180° C.) are common in electric motors. Operation above this temperature does not lead to immediate failure of the insulation, but the insulation properties can (temporarily) deteriorate and the service life or resistance to aging can be reduced (permanently). This is acceptable to a certain extent, especially with sufficiently precise knowledge of the temperature-related aging behavior of an insulation material, while taking into account the product requirements.

In one configuration variant, annealing is therefore carried out at temperatures above the insulation class, where the cumulative annealing duration over the service life does not exceed 10% of the utilization time. Temperatures of 150-250° C., in particular 170°+−10° C., should be aimed for. Typical time intervals for thermal treatment are between 30-300 minutes.

Particular advantages can arise depending on the production stage at which thermal treatment is carried out.

For example, it can be provided that thermal treatment takes place after the completion of the electric motor and prior to the installation into a vehicle, and that thermal treatment takes place at an excessive temperature. Excessive temperature presently means a temperature above the temperature permitted by the insulation class. This aggressive variant in production has the advantage of provoking early failure of the system and to thereby prevent fault-prone products from being installed into the end product.

Thermal treatment of the compressed strand within the production line, i.e., after completion of the component or after completion of the electric motor and prior to the installation into the vehicle, can preferably be carried out in parallel with other quality tests so that the duration of the production process is not or only hardly extended by the thermal treatment of the compressed strand. The test run of the motor system during the final acceptance is preferred for this.

As already mentioned, the thermal treatment on the compressed strand can also take place after or during the vehicle's initial operation. This is preferably done by way of active temperature management. In order to keep the temperature high in time intervals when the motor is little used, active temperature management can comprise the following measures: a) intentionally lowering or even shutting off the motor cooling b) generating motor heat through idle load, e.g., as a result of intentionally applied leakage currents that generate heat but no torque. The annealing process is preferably repeated regularly, e.g., quarterly or annually, to prevent aging-related deterioration in the electrical conductivity. Depending on the application, the current supply should advantageously be selected such that there is presently torque occurring or there is presently no torque occurring (e.g., direct current does not generate any torque in an asynchronous machine). The proposed method is particularly suitable for compressed strands having a degree of compaction higher than 80%. The degree of compaction means the ratio of the wire area (copper wire and the insulating varnish surrounding it) to the smallest ensheathing of the compressed strand (excluding the main insulation).

Features and details described in the context of the method of course also apply in the context of a device described and vice versa, so that reference is or can always be made reciprocally with regard to the disclosure of the individual aspects of the invention.

LIST OF REFERENCE CHARACTERS

The following reference characters are used in the figures:
K motor vehicle
E electric motor
1 stator
2 rotor
3 compressed strand
4 interconnection web
31 wire packet
32 insulation
33 barrel
311 wire

The invention claimed is:

1. A method for the thermal treatment of a compressed strand of an electric motor of an electric vehicle, wherein the thermal treatment of the compressed strand is carried out after the electrical motor is assembled within the vehicle,
wherein heating said compressed strand for thermal treatment is carried out by applying electric current to said compressed strand,
wherein the thermal treatment on said compressed strand is completed after or during an initial operation of the vehicle once put in service, and said compressed strand is heated by regulating or switching off the motor cooling and/or by idling load, as a result of intentionally applied leakage currents which generate heat but no torque.

2. The method according to claim 1, wherein the thermal treatment is recrystallization annealing or stress relief annealing.

3. The method according to claim 1, wherein said component of said electric motor is a stator or a rotor of said electric motor.

4. The method according to claim 1, wherein the thermal treatment is carried out at a temperature of 150-250° C.

5. The method according to claim 1, wherein a single thermal treatment is carried out over a period of 30 to 300 minutes.

6. The method according to claim 1, wherein the cumulative thermal treatment period does not exceed a proportion of 10% of an operating time of said compressed strand.

7. The method according to claim 1, wherein the thermal treatment is repeated regularly.

8. The method according to claim 1, wherein the compressed strand has a degree of compaction higher than 80%.

9. The method according to claim 1, wherein said compressed strand is equipped with an insulation material, where the thermal treatment is carried out at a temperature equal to the temperature resistance of said insulation material.

10. The method according to claim 1, wherein the thermal treatment is carried out at a temperature of 170°+−10° C.

11. The method according to claim 1, wherein the thermal treatment is repeated quarterly or annually.

* * * * *